United States Patent [19]

Ikedo et al.

[11] Patent Number: 4,788,677
[45] Date of Patent: Nov. 29, 1988

[54] DISK SUPPORT MECHANISM IN A PLAYER

[75] Inventors: Yuji Ikedo; Kenichi Takahashi, both of Saitama, Japan

[73] Assignee: Pioneer Electronic Corporation, Tokyo, Japan

[21] Appl. No.: 11,477

[22] Filed: Feb. 5, 1987

[30] Foreign Application Priority Data

Feb. 5, 1986 [JP] Japan ................................ 61-24881
Feb. 5, 1986 [JP] Japan ................................ 61-24884

[51] Int. Cl.⁴ .............................................. G11B 3/10
[52] U.S. Cl. .................................. 369/223; 369/215; 369/249
[58] Field of Search ............... 369/223, 249, 221, 219, 369/215, 244

[56] References Cited

U.S. PATENT DOCUMENTS

3,954,272 5/1976 Leedom ............................. 369/249
4,003,059 1/1977 Sugiura et al. ..................... 369/223
4,337,538 6/1982 Wilkenson et al. ................ 369/223

Primary Examiner—Steven L. Stephan
Attorney, Agent, or Firm—Sughrue, Mion, Zinn, Macpeak & Seas

[57] ABSTRACT

A support mechanism for a disk player in which a turntable is supported on a metal plate which is screwed to a resin plate. A carriage carrying an optical pickup and its drive are mounted on the resin plate between the two plates but the carriage is guided by the metal plate. The optical pickup tracks the disk through an opening in the metal plate.

6 Claims, 6 Drawing Sheets

DISK SUPPORT MECHANISM IN A PLAYER

BACKGROUND OF THE INVENTION

1. Field of the Invention

The present invention relates to a recorded disk player. Particularly, it relates to a disk player for playing a digital audio disk having PCM signals recorded thereon.

2. Background of the Invention

Figure 8:
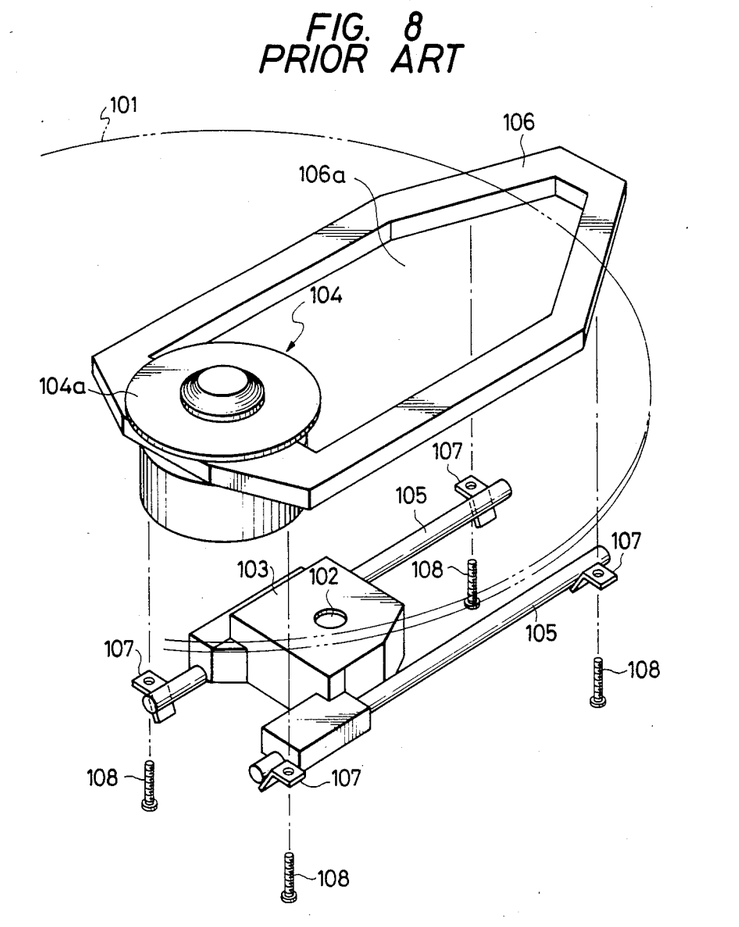
FIG. 8 is a view for explaining a disk player which has been already developed.

There are many disk players for playing digital audio disks. For example, a disk player of a so-called optical signal detecting system applies a laser beam onto signal pits recorded in a disk and changes in reflection light depending on existence of the signal pits are detected to thereby read out signals. FIG. 8 shows a main portion of the disk player of the optical signal detecting system which has been already developed.

As shown in FIG. 8, there is provided a carriage 103 for carrying optical pickup means including an objective lens 102 for irradiating the surface of a disk 101 with a spot light. The carriage 103 is slidably supported by a pair of guide shafts 105 arranged in parallel to a disk carrying surface 104a of a turntable 104. The guide shafts 105 are attached, by means of fixing springs 107 and screws 108, to a base member 106, which acts as a support mechanism for supporting the turntable 104. The base member 106 is obtained by die-casting a raw material such as aluminum. Although not shown in the drawing, a means for driving the carriage 103 along the guide shaft 105 is provided on the base member 106. An opening portion 106a is formed in the base member 106 so that the carriage 103 is moved in the opening portion 106a.

It is necessary to establish the relative positional dimensions of the turntable 104 and the guide shaft 105 with high accuracy. Therefore, the base member 106 is necessarily formed with high accuracy and also with high stiffness. As described above, however, not only the turntable 104 and the guide shafts 105 but also the above-mentioned driving means and the like are attached on the base member 106. As a result, the shape of the base member 106 has become complicated and it has not been always easy to form the base member 106 with high accuracy and with predetermined stiffness, resulting in an increase in cost. Further, many parts are attached to the base member 106 which can not be transformed, so that the efficiency in assembling work has been decreased.

SUMMARY OF THE INVENTION

The present invention has been achieved in view of the problems described above. Accordingly, an object of the present invention is provide a recorded disk player having a support mechanism which supports a turntable, optical pickup means, etc. and in which cost is low and assembling workability is good.

A recorded disk player, according to the present invention, is featured in that the disk player comprises a support mechanism, a turntable, guiding means and driving means. The turntable, the guiding means and the driving means are supported by the support mechanism. The disk player also includes a carriage for carrying optical pickup means. The carriage is guided and driven by the guiding means and the driving means in the direction substantially parallel to a disk carrying surface of the turntable. The support mechanism is constituted by a first and a second support plate. The first and second plates are arranged to be separate from each other in the direction substantially perpendicular to the disk carrying surface and are coupled with each other. The turntable is attached on the first support plate. The guiding means is engaged with the first support plate, is positioned relative to the turntable, and is fixed by being sandwiched by the first and second support plates. The driving means is provided on the second support plate.

BRIEF DESCRIPTION OF THE DRAWINGS

FIGS. 3 through 6b are views showing parts of the inner structure in detail respectively.

DETAILED DESCRIPTION OF THE PREFERRED EMBODIMENTS

Referring to the accompanied drawings, an embodiment of the information recorded disk player according to the present invention will be described hereunder.

Figure 1:
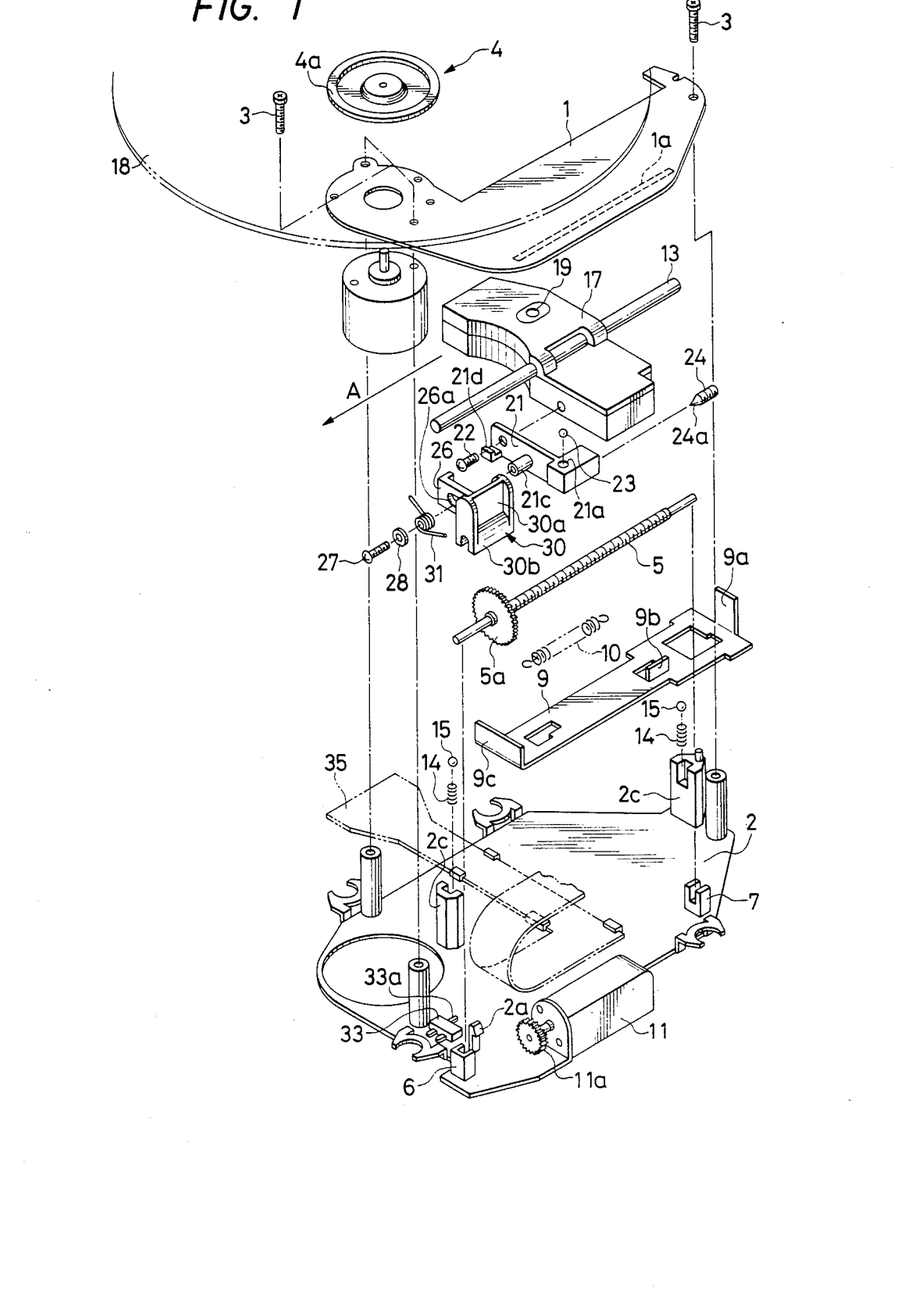
FIGS. 1 and 2 are respectively a perspective view and a top view showing an inner structure of the information recorded disk player according to the present invention.
Figure 2:
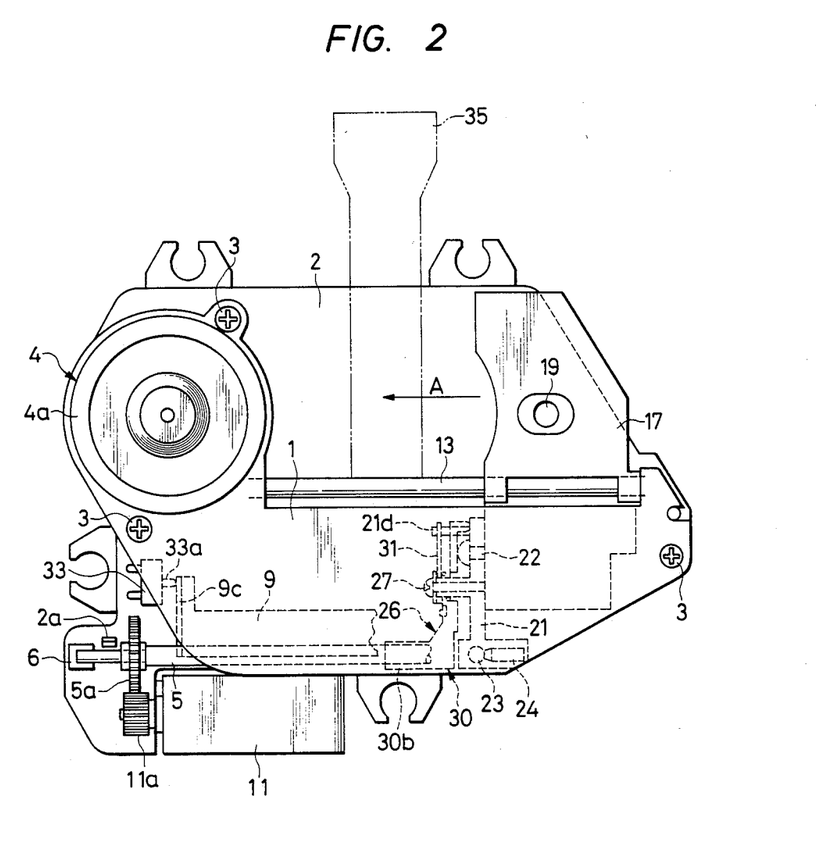

As shown in FIGS. 1 and 2, the disk player is provided with a support mechanism constituted by a pair of support plates 1 and 2 arranged in parallel to each other. The upper support plate 1 is made of a steel plate and the lower support plate 2 is made of resin. The support plates 1 and 2 are connected to each other by means of screws 3. A turntable 4 is attached to the upper support plate 1. The support plates 1 and 2 are arranged to be separated from each other at a predetermined distance in the direction perpendicular to a disk carrying surface 4a of the turntable 4. A screw shaft 5 extending in parallel to the disk carrying surface 4a of the turntable 4 is disposed between the support plates 1 and 2. The screw shaft 5 is rotatably supported at its opposite ends by a pair of bearing members 6 and 7 connected to the lower support plate 2. The screw shaft 5 is movable along its rotary center axis within a predetermined range. A pawl 2a for preventing the screw shaft from coming off from the bearing members 6 and 7 is integrally formed on the lower support plate 2.

Figure 3:
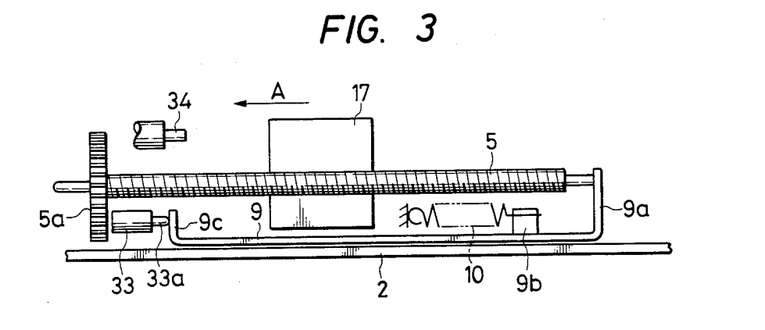

As shown also in FIG. 3, a moving member 9 made of a steel plate is disposed under the screw shaft 5 and attached to the support plate 2 so as to be movable along the screw shaft 5. The moving member 9 has an elevated end 9a so that the moving member 9 is engaged with an end of the screw shaft 5 at the elevated end 9a so as to urge the screw shaft 5 against the bearing member 6 (FIG. 1). A coil spring 10 acting as means for applying an urging force to the moving member 9 is connected to a raised portion 9b formed on the moving member 9 at its substantially central portion. A motor 11 (FIG. 1) is provided on the support plate 2 and on the side of the screw shaft 5. A spur gear 11a fitted on an output shaft of the motor 11 is engaged with another spur gear 5a fitted on the screw shaft 5. The spur gear 11a is so thick that the spur gear 5a never comes off from the spur gear 11a when the screw shaft 5 moves within a predetermined range in the direction of the rotary center axis of the screw shaft 5.

Figure 4A:
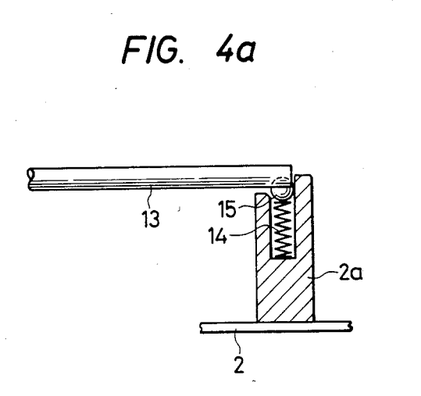

As shown in FIG. 1, a single guide shaft 13 is provided in parallel to the screw shaft 5 and is supported at its opposite ends by legs 2c formed on the lower support plate 2. As shown also in FIGS. 4a and 4b, a coil spring 14 is compressed between the guide shaft 13 and each of the legs 2c. A ball 15 is provided between the guide shaft 13 and each of the coil springs 14. That is, the guide shaft 13 is engaged at its opposite ends with the lower surface portions of the upper support plate 1 so as to be positioned relative to the turntable 5 so that the guide shaft 13 is fixed by being sandwiched between the support plates 1 and 2. The coil springs 14 and the balls 15 constitute means for attaching the opposite end portions of the guide shaft 13 to the above-mentioned support mechanism (constituted by the support plates 1 and 2).

Figure 4B:
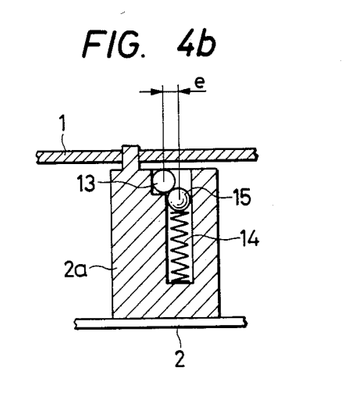

As shown in FIG. 4b, the coil center axis of the coil spring 14 is displaced by a distance e from the center axis of the guide shaft 13 so as not to cross each other. Because of this arrangement, the guide shaft 13 can be prevented from having any play in the direction parallel to the respective support plates 1 and 2.

As shown in FIGS. 1 and 2, a carriage 17 is slidably supported at its center of gravity by the guide shaft 13. The carriage 17 carries optical pickup means including an objective lens 19 for causing a spotlight to impinge onto the recorded surface of an information recorded disk 18 (shown in FIG. 1) which is to be played.

Figure 5A:
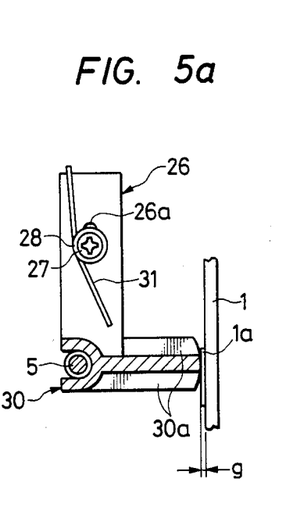
Figure 5B:
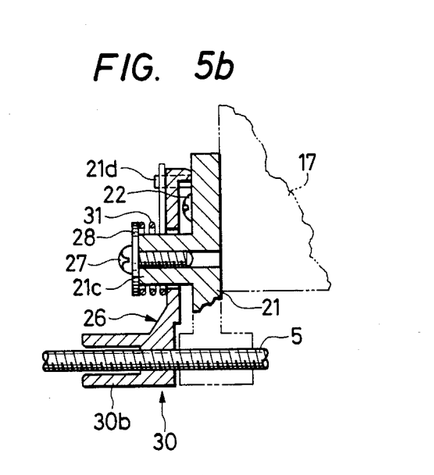

As shown in FIGS. 1, 2, and 5b, a holder 21 forming a part of the carriage 17 is attached by a screw 22 to the carriage 17 at its end portion in the moving direction of the carriage 17. As shown in FIGS. 1, 2, 6a, and 6b, a circular groove 21a substantially perpendicular to the disk carrying surface 5a of the turntable 5 is formed in the holder 21 and a ball 23 is inserted into the circular groove 21a. The ball 23 is in sliding-contact with a guide path 1a (shown in FIG. 1) formed in parallel to the guide shaft 13 in the lower surface of the upper support plate 1 which is a part of the above-mentioned support mechanism. A taper portion 24a is formed on a tip end of an adjusting screw 24 engaged with the ball 23. The adjusting screw 24 is thread-engaged with the holder 21. The ball 23 and the adjusting screw 24 constitute means for adjusting an angle of inclination of the carriage in a plane perpendicular to the moving direction of the carriage 17. That is, the angle of inclination of the carriage 17 may be adjusted by turning the adjusting screw 24. The adjusting screw means is constituted by simple and inexpensive members such as the ball 23 and the adjusting screw 24 so that the assembly work becomes easy and the cost is reduced.

Figure 6A:
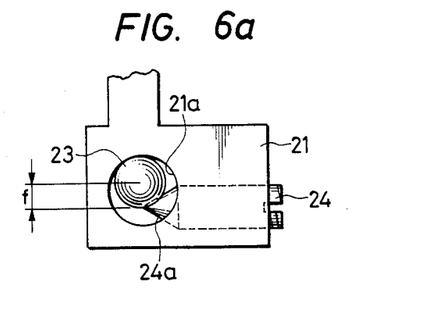
Figure 6B:
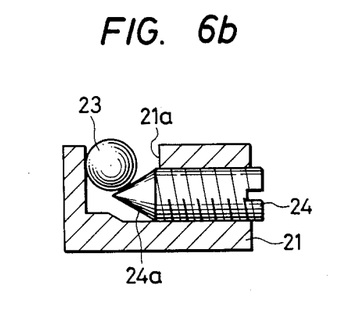

As shown in FIG. 6a, the center axis of the adjusting screw 24 is displaced by a distance f from the center of the ball 23 so as not to cross each other. Accordingly, the ball 23 is prevented from having any play in the circular groove 21a in the holder 21. The adjusting screw 24 is provided in parallel to the moving direction of the carriage 17. Accordingly, even if the carriage 17 is stopped at any position on the guide shaft 13, the adjusting screw 24 may be turned only by an adjusting driver which is inserted in parallel to the guide shaft 13. That is, the provision of a single opening portion for inserting a driver in a player housing of the information recorded disk player suffices for the adjustment.

As will be apparent from FIGS. 1 and 2, the carriage 17 is held at its one side with respect to the moving direction of the carriage 17 so as to be guided by the guide shaft 13 along the guide path 1a (shown in FIG. 1) of the support plate 1. The objective lens 19 carried by the carriage 17 is arranged on the other side of the carriage 17 with respect to the above-mentioned one side and is disposed outside the main surface of the upper support plate 1. More in detail, the objective lens 19 is disposed in a plane parallel to the main surface of the support plate 1 at the outside of the outline of the support plate 1. This arrangement makes it possible to miniaturize the upper support plate 1. This is because if the carriage 17 is to be guided while being held at its opposite sides by the guide shaft 13, the upper support plate 1 for positioning the guide shaft must be elongated so as to extend from the above-mentioned one side portion of the carriage 17 to the other side portion of the carriage 17. As shown in FIGS. 1, 2, 5a, and 5b, an arm member 26 is swingably attached at its one end to the holder 21 provided on the carriage 17 through a screw 27 and a washer 28. A center axis of the screw 27, that is, a swinging center axis of the arm member 26, is parallel to the screw shaft 5 so that the arm member 26 swings in a plane perpendicular to the rotatory center axis of the screw shaft 5. A half nut 30 acting as a nut member is provided on the free end of the arm member 26 and is thread-engaged with the screw shaft 5. An elongated hole 26a is formed in the arm member 26 so as to extend in the direction substantially perpendicular to the rotary center axis of the screw shaft 5. The screw 27 is slidably fitted into the hole 26a so that the arm member 26 is supported by the screw 27. That is, the arm member 26 is arranged to be movable in the range of the elongated hole 26a in the direction substantially perpendicular to the rotary center axis of the screw shaft 5.

In the case of assembling the above-mentioned screw shaft 5, the guide shaft 13, the carriage 17, the arm member 26, and so on, the relative positional distance between the screw shaft 5 and the carriage 17 in the direction substantially perpendicular to the moving direction of the carriage may be sometimes displaced from a proper relative positional distance. The displacement may be corrected because the arm member 26 is movable owing to the elongated hole 26a in the direction substantially perpendicular to the rotary center axis of the screw shaft 5.

As shown in FIGS. 1 and 5b, a spring 31 is fitted on a cylindrical portion 21c formed on the holder 21 into which the screw 27 is inserted. One end portion of the spring 31 is engaged with a protrusion 21d projecting from the holder 21 at an end surface thereof and the other end portion of the spring 31 is engaged with the arm member 26 at its free end. The spring 31 operates as abutting means for urging the arm member 26 so as to cause the above-mentioned half nut 30 to abut on the screw shaft 5. The spring 31 is also used as urging means for urging the carriage so as to cause the ball 23 provided in the carriage 17 (in the holder 21) to approach the guide path 1a of the support plate 1 (in FIG. 1).

As shown in FIG. 5a, the half nut 30 provided on the arm member 26 at its free end is disposed between the screw shaft 5 and the support plate 1 and a projecting portion 30a is formed on the half nut so as to be separated with a slight gap g from the guide path 1a (FIG. 1) which acts as an abutting plane provided on the support plate 1 as shown also in FIG. 1.

As shown FIGS. 1, 2 and 5b, a semi-cylindrical limit portion 30b is formed on the half nut 30 for limiting the swing of the half nut 30 in the direction along the rotary center axis of the screw shaft by slidingly contacting with the screw shaft 5. The provision of the limit portion 30b makes it possible that the half nut 30, and hence the arm member 26, may be smoothly moved along the screw shaft 5 without being swung in the direction of the rotary center axis of the screw shaft 5.

Guiding means guide the carriage 17 along the disk carrying surface 4a of the turntable 4, that is, along the recorded surface of the information recorded disk 18. The guiding means is composed of the guide path 1a of the support plate 1, the guide shaft 13, the attaching means constituted by the coil spings 14 and the balls 15, the adjusting means constituted by the balls 23 and the adjusting screw 24. The spring 31 acts as the above-mentioned urging means. Small circumferential members are associated with those elements described above. Driving means for driving the carriage 17 is composed of the screw shaft 5, the bearing members 6 and 7 on the support plate 2, the motor 11, the spur gear 11a, the arm member 26, the half nut 30, the spring 31 acting as the above-mentioned abutting means, and small circumferential members associated with those elements described above. As will be apparent from the above description, the driving means is provided on the lower support plate 2.

As shown in FIGS. 1 through 3, a detecting switch 33 is disposed on the lower support plate 2 so that an actuator 33a of the detecting switch 33 is engagable with an elevated portion 9c formed on the moving member 9 at its other end. Further, as shown FIG. 3, there is provided a movement limit member 34 which is arranged to abut on the end portion of the carriage 17 in its moving direction so as to limit the movement of the carriage 17 at a home position of the carriage 17, that is, at a stationary position before play. The movement limit member 34 is integrally formed on the lower support plate 1.

Detecting/stopping means for detecting the fact that the carriage 17 has been carried to the above-mentioned home position and for stopping the carriage 17 thereat is constituted by the above-mentioned detecting switch 33, the movement limit member 34, the moving member 34, the moving member 9, and the coil spring 10 acting as the urging means.

As shown in FIGS. 1 and 2, a flexible printed circuit substrate 35 is arranged to supply electric power to the optical pickup means on the carriage 17 and to transfer read-out signals.

Figure 7A:
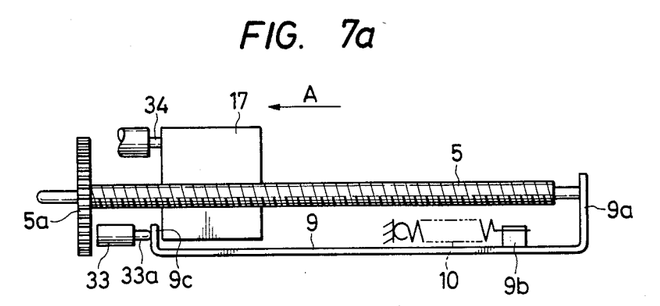
FIGS. 7a and 7b are views for explaining the operation of the information recorded disk player.
Figure 7B:
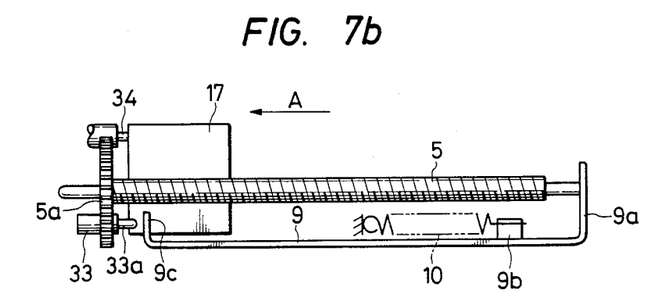

Referring to FIGS. 7a and 7b, the operation of the above-mentioned information recorded disk player will be briefly described.

Upon rotation of the motor 11, the screw shaft 5 is rotated and the carriage 17 is driven to move in the direction of an arrow A. The movement is accomplished through the half nut 30, the arm member 26, and the spring 31. As shown in FIG. 7a, upon arrival of the carriage 17 at the home position, the carriage 17 abuts against the movement limit member 34 so as to be prevented from moving. Then, as shown in FIG. 7b, the screw shaft 5 is moved by the reaction of the screw shaft 5 in the direction opposite that of the arrow A and the moving member 9 is also moved as the movement of the screw shaft 5. The movement of the moving member 9 is detected by the detecting switch 33, so that the carriage 17 is caused to stop. Thereafter, the carriage 17 is driven to move in the opposite direction to the arrow A so that play is effected.

As described above in detail, in the information recorded disk player according to the present invention, a support mechanism supports: a carriage (17) carrying optical pickup means; guiding means for guiding the carriage (a guide shaft 13); driving means for driving the carriage (a screw shaft 3, a motor 11, and so on); a turntable, and so on. The support mechanism is constituted by a first and a second support plate (1,2) which are separated from each other in the direction substantially perpendicular to a disk carrying surface of the turntable. The support plates are coupled with each other. The first support plate is made of a copper plate or the like. The turntable is attached on the first support plate (1), the guiding means being engaged with the first support plate so as to be positioned relative to the turntable and being fixed by being sandwiched by the first and second support plates. The driving means is provided on the second support plate (2) which made of resin or the like.

Thus, only the parts necessary to perform the relative positioning of the turntable and the above-mentioned guide means of the support mechanism are made of a steel plate or the like which can be formed in low cost and with high accuracy, so that the cost as a whole of the support mechanism is low. Further, when each of the parts is attached to the second support plates made of resin or the like, transforming property or elasticity of the second support plate can be used, so that the assembling workability is improved.

Further, both the support plates are connected to each other with a predetermined distance therebetween as described above, so that the stiffness as a whole of the support mechanism is sufficiently large.

What is claimed is:

1. A disk player comprising:
   a support mechanism including a first plate-like support member with an opening in a main surface thereof;
   a turntable mounted on said first support member for bearing and rotating a disk on a disk carrying surface adjacent said opening;
   guiding means provided on said first support member and including a linear sliding member and holding means; and
   a carriage which carries optical pickup means including an objective lens for causing a spotlight to impinge onto a recording surface of a disk and which slides on said sliding member and is guided by said guiding means in a moving direction substantially parallel to said disk carrying surface of said turntable, said carriage being held against said first support member by said holding means on a first side of said carriage with respect to said linear sliding member so as to be guided by said guiding means, said objective lens being disposed on a second side of said carriage opposite said first side with respect to said linear sliding member and being disposed adjacent said opening of said first support member.

2. An information recorded disk player as recited in claim 1, in which said guiding means further comprises means for adjusting an angle of inclination of said carriage in a plane perpendicular to the moving direction of said carriage.

3. A disk player as recited in claim 1, wherein said support mechanism further includes an auxiliary plate-like support member fixed to said first plate-like support member, wherein said guiding means and said turntable are mounted on said first plate-like support member and further comprising supporting means mounted on said auxiliary support member for supporting said carriage and moving means mounted on said auxiliary support member for moving said carriage along said moving direction.

4. A disk player as recited in claim 3, wherein said carriage, said supporting means and said moving means are disposed between said first support member and said auxiliary support member.

5. A disk player as recited in claim 3, wherein said first plate-like support member is metallic and wherein said auxiliary support member substantially consists of a resin.

6. A disk player as recited in claim 1, wherein said objective lens is disposed at an outside of an outline of said first plate-like support member.

* * * * *